United States Patent [19]

Davis et al.

[11] Patent Number: 4,812,807
[45] Date of Patent: Mar. 14, 1989

[54] VEHICLE MOTION INDICATOR

[76] Inventors: Jesse F. Davis, 2737 11th Ave., Port Arthur, Tex. 77642; John C. Prevost, Ret. 3 Box 259A, Buna, both of Tex. 77612

[21] Appl. No.: 130,271

[22] Filed: Nov. 23, 1987

[51] Int. Cl.$^4$ .................................................. B60Q 1/00
[52] U.S. Cl. ...................................... 340/464; 340/468
[58] Field of Search ................ 340/66, 71, 72, 67, 340/74, 94; 307/10 LS

[56] References Cited

U.S. PATENT DOCUMENTS

| | | | |
|---|---|---|---|
| 2,751,522 | 6/1956 | Spangenberg | 340/66 |
| 2,957,161 | 10/1960 | Daws | 340/66 |
| 3,949,361 | 4/1976 | Replogle | 340/66 |

Primary Examiner—Donnie L. Crosland
Attorney, Agent, or Firm—Kenneth D. Baugh

[57] ABSTRACT

A vehicle motion indicating device 10 is provided for giving visual indications that a vehicle is stopping, accelerating and decelerating. The vehicle motion indicating device 10 is provided with a pair of relays 20 and 22 which are activated upon closing of a brake switch 16 and accelerator switch 18, respectively. When the relay 20 is activated a green light 42 illuminates to provide an indication that the vehicle is accelerating. When the relay 22 is activated a red light 38 illuminates to provide an indication that the vehicle is stopping. When the relays 20 or 22 are deactivated an amber light 40, illuminates to provide an indication that the vehicle is decelerating.

6 Claims, 3 Drawing Sheets

VEHICLE MOTION INDICATOR

TECHNICAL FIELD

This invention relates to a vehicle and more particularly to a motion indicating device to be used on the vehicle to facilitate the signalling of drivers in other vehicles as to the state of motion of the signalling vehicle. Vehicle signalling is very important in assuring the safety of a vehicle and its occupants. The common practice is to provide signalling devices which indicate whether a vehicle is stopping or turning. However, other vehicle motions such as acceleration and deceleration are just as important in assuring driver and vehicle safety. Since indicating these motions is important in assuring safety it is desirable to make these motions readily capable of being signalled to other drivers. Such signalling becomes even more important in a modern society such as ours where crowded road and highway conditions are the rule rather than the exception. Thus effective vehicle signalling can be ever so important in contributing to driver safety and helping to eliminate vehicle accidents.

BACKGROUND ART

Attempts have been made to provide light warning systems for automotive vehicles. One such device is disclosed in U.S. Pat. No. 4,470,036. In this device an acceleration sensitive device utilizing an elaborate combination of weights, springs, switches and semiconductor devices is provided. Depending on how the combination is utilized an indication of vehicle activity such as stopping, acceleration and deceleration will be provided.

Another device is disclosed in U.S. Pat. No. 3,676,844. In this device the primary component is an elaborate electromechanical switch. With this switching arrangement changes in the condition of the automobile are indicated depending on the state of the electromechanical switch.

DISCLOSURE OF THE INVENTION

The invention relates to a vehicle motion indicating device. The vehicle motion indicating device includes a first and a second light for providing an indication that the vehicle is stopping and accelerating, respectively. The device also includes a third light for providing an indication that the vehicle is decelerating. A means for activating the first, second and third light is provided. Additionally a first means, including a first switch, for coupling the light activating means to the first light and for enabling the activation of the first light upon closing of the switch is provided. A second means, including a first switch, for coupling the light activating means to the second light and for enabling the activation of the second light upon closing of the switch is also provided. Still further a third means, including a pair of switches, one of the pair of switches being a second switch included in the first means and the other of the pair of switches being a second switch included in the second means which is coupled to the second switch in the first means is provided. The third means couples the light activating means to the third light and enables the activation of the third light upon closing of the pair of switches.

BRIEF DESCRIPTION OF THE DRAWING

The details of the invention will be described in connection with the accompanying drawing in which.

BEST MODE FOR CARRYNG OUT THE INVENTION

Figure 1:
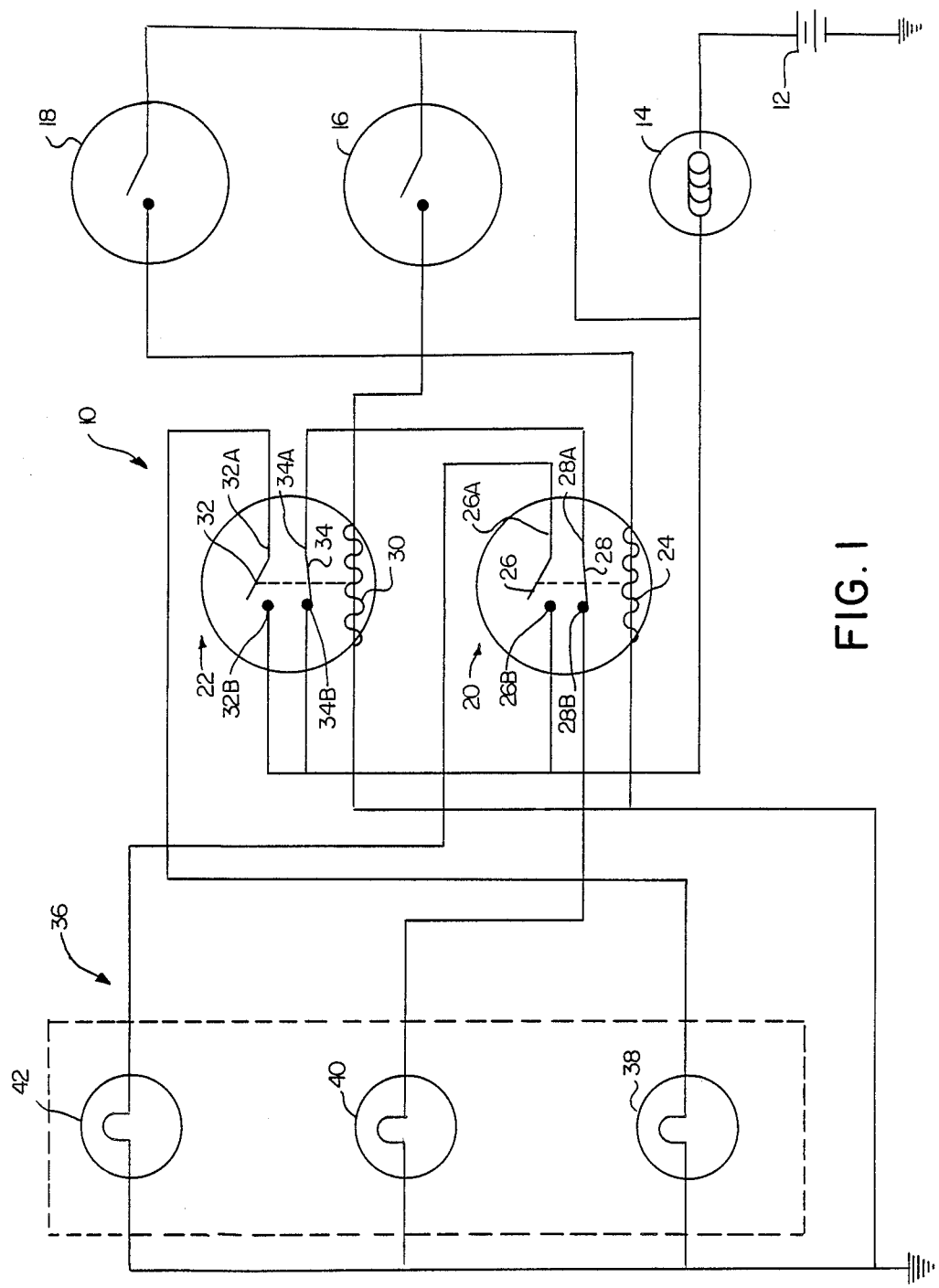
FIG. 1 is a schematic diagram illustrating the motion indicating device in accordance with the principles of this invention.

Referring to FIG. 1 there is shown, a vehicle motion indicating circuit and device, generally designated by the numeral, 10. The motion indicating device 10 includes a voltage source 12. The voltage source 12 is electrically coupled through a fuse 14 to a brake switch 16 and an accelerator switch 18. The fuse 14 is provided to protect the circuit 10 from voltage surges and other overload conditions. The brake switch 16 is coupled to the brake of the vehicle (not shown) and will close when the brake is pressed to stop the vechicle. Similarly the switch 16 will remain open when the brake is not in use. The accelerator switch 18 is coupled to the accelerator of the vehicle (not shown) and will close upon movement of the accelerator to increase the speed of the vehicle and open when there is no such movement.

The motion indicating circuit device 10 also includes a pair of relays, generally designated by the numerals, 20 and 22, respectively. The relay 20 is provided with a coil 24 and switches 26 and 28. The switch 26 is provided with switching terminals 26A and 26B and the switch 28 is provided with switching terminals 28A and 28B. The relay 22 is also provided with a coil 30 and switches 32 and 34 having switching terminals 32A and 32B and switching terminals 34A and 34B, respectively. The relays 20 and 22 are electrically coupled to each other at terminals 34A and 28A and to the power supply 12 through fuse 14 at terminals 32B, 34B and 26B.

The accelerator switch 18 is coupled to ground through the coil 24 of the relay 20 and the brake switch 16 is coupled to ground through the coil 30 of the relay 22. When the accelerator switch 18 is closed the power supply 12 will energize the coil 24 of relay 20. Similarly when the brake switch 16 is closed the power supply 12 will energize the coil 30 of the relay 22.

The motion indicating circuit device 10 also includes a light indicating means, generally designated by the numeral, 36 having colored indicators 38, 40 and 42. The indicator 38 may be, for example red, the indicator 40 may be amber and the indicator 42 green.

The red indicator 38 is coupled from ground to the switch 32 of the relay 22 at the terminal 32A and the green indicator 42 is coupled from ground to the switch 26 of the relay 20 at the terminal 26A. The amber indicator 40 is coupled from ground to the switch 28 of the relay 20 at the terminal 28B.

FIG. 1, illustrates the condition when the automobile is neither stopping or accelerating. That is neither the brake or accelerator are being depressed thus the vehicle is motionless or decelerating. In this instance the brake switch 16 and accelerator switch 18 are open.

When the ignition switch (not shown) of the automobile is turned on 12 volts from the power supply 12 is coupled to terminals 32B and 34B of relay 22 and terminal 26B of relay 20. Since the brake switch 16 and the accelerator switch 18 are open power is not coupled to the coils 24 and 30 to energize the relays 20 and 22, respectively. When the relays 20 and 22 are not energized the switches 28 and 34 are normally closed. As a result a circuit path is provided from the power supply 12 through switch 34 in relay 22 through terminals 34B and 34A to terminal 28A in relay 20 through switch 28 and through the amber light 40 to ground. Accordingly the amber light 40 is illuminated.

Figure 2:
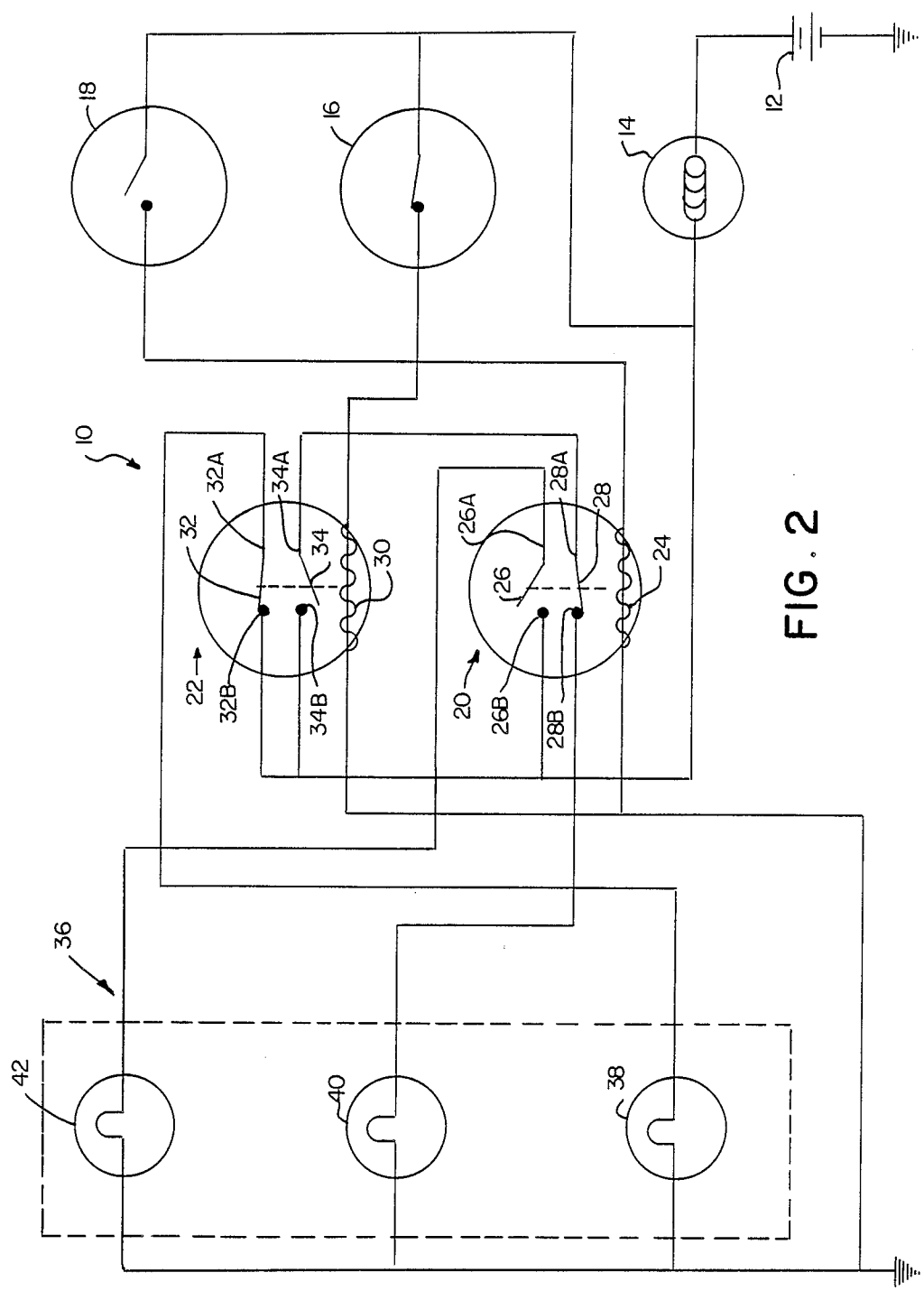
FIG. 2 is a schematic diagram illustrating the motion indicating device when the vechicle is stopping in accordance with the principles of this invention.

FIG. 2 illustrates the condition of the motion indicating circuit device 10 when the automobile is stopping. In this condition the brake switch 16 is closed as a result of the driver stepping on the brake. When the brake switch 16 is closed power from the power supply 12 energizes the coil 30 of relay 22. When the coil 30 is energized it causes the normally closed switch 34 of the relay 22 to open and the normally open switch 32 to close. When the switch 34 opens this causes an interuption of power to the amber light 40 causing the amber light to go off. When the switch 32 closes a circuit path is created from the power supply 12 through switch 32, the red light 38 to ground. This of course energizes and illuminates the red light 38 thereby providing an indication that the vehicle is stopping.

Figure 3:
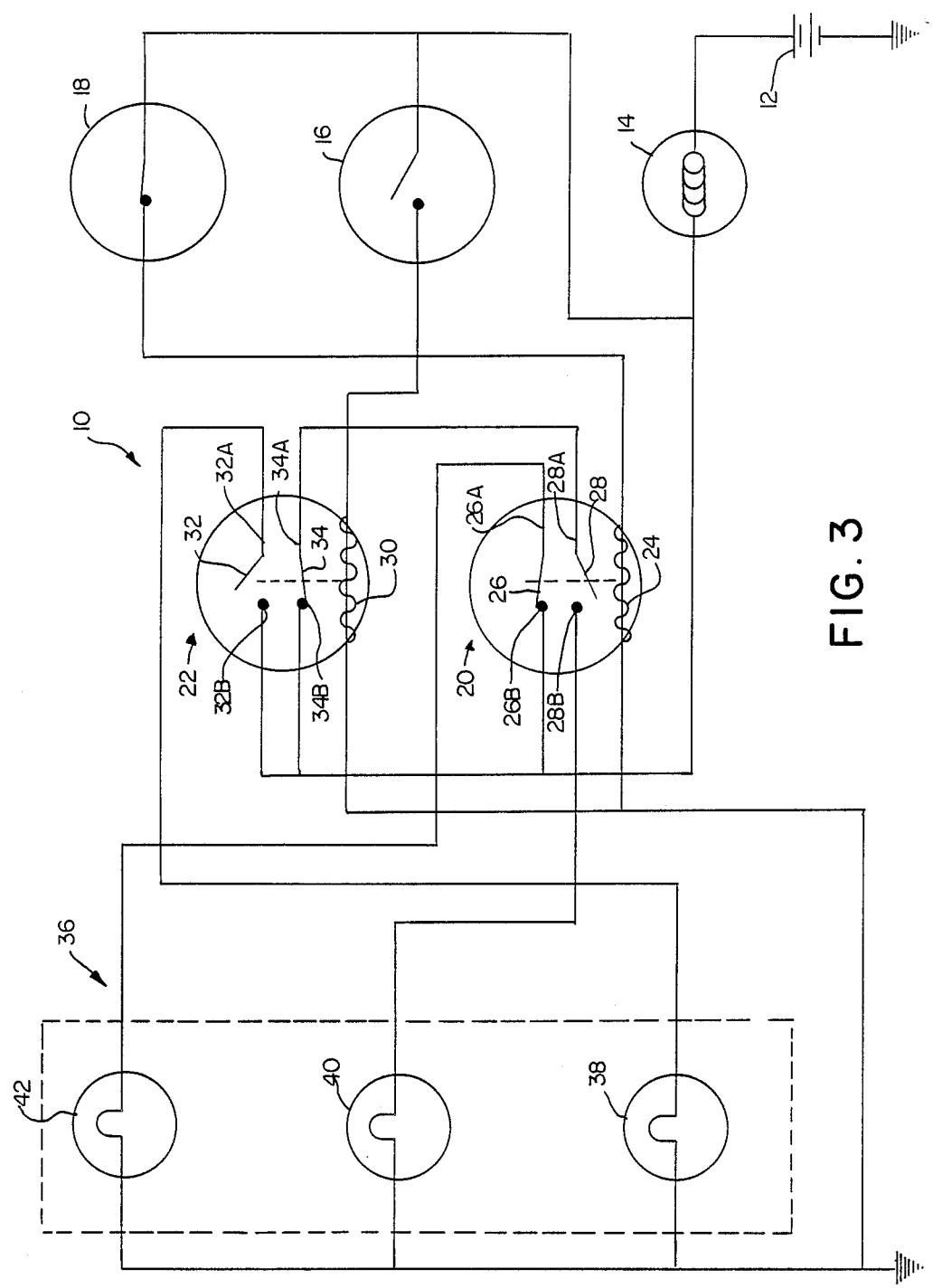
FIG. 3 is a schematic diagram illustrating the motion indicating device when the vehicle is accelerating in accordance with the principles of the invention.

FIG. 3, illustrates the operation of the device 10 when the automobile is accelerating. When a driver presses on the automobile accelerator this causes the accelerator switch 18 to close thus allowing power to energize the coil 24 of the relay 20. Energizing the coil 24 of relay 20 causes the normally open switch 26 in the relay to close and the normally closed switch 28 to open. When the switch 26 closes power is transmitted to the green light 42 through terminals 26B, and 26A thus causing the light to be energized and illuminated.

Because the switch 28 opens at the same instant the switch 26 closes power to the amber light 40 is interrupted thus causing the amber light to go off.

As a result of the vehicle motion indicating device 10 vehicles can provide indications of acceleration, stopping and the transition between accelerating and stopping (decelerating). This of course adds another degree of certainty for other drivers and another degree of safety for the road.

The invention has been shown and described in what is considered to be the most practical and preferred embodiment. However, it should be recognized that changes may be made by those skilled in the art without departing from the spirit and scope of the invention.

What is claimed

1. A vehicle motion indicating device including:
   a first light for providing an indication that the vehicle is stopping;
   a second light for providing an indication that the vehicle is accelerating;
   a third light for providing an indication that the vehicle is decelerating;
   means for activating the first, second and third lights;
   a first means, including a first switch, for coupling the light activating means to the first light and for enabling the activation of the the first light upon closing of the switch to thereby provide a indiction that the vehicle is stopping;
   a second means, including a first switch, for coupling the light activating means to the second light and for enabling the activation of the second light upon closing of the switch to thereby provide an indication that the vehicle is accelerating ; and
   a third means, including a pair of switches, one of the pair of switches being a second switch included in the first means and the other of the pair of switches being a second switch included in the second means which is coupled to the second switch in the first means, for coupling the light activating means to the third light and for enabling the activation of the third light upon closing of the pair of switches to thereby provide an indication that the vehicle is decelerating.

2. A vehicle motion indicating device as defined in claim 1 wherein the first means further includes a first switch actuating means, responsive to the light activating means, for closing the first switch in the first means to activate the first light and for opening one of the second switches in the third means to deactivate the third light when the first switch in the first means is closed.

3. A vehicle motion indicating device as defined in claim 2 wherein the second means further includes a second switch actuating means, responsive to the light actuating means, for closing the first switch in the second means to activate the second light and for opening the other of the pair of second switches in the third means to deactivate the third light when the first switch in the second means is closed.

4. A vehicle motion indicating device as defined in claim 3 wherein the first means includes a third switch, responsive to the vehicle brake, which enables the first switch actuating means to close the first switch in the first means and open one of the pair of second switches in the third means when force is applied to the brake and which enables the first switch actuating means to open the first switch and close the second switch when no force is applied to the brake.

5. A vehicle motion indicating device as defined in claim 4, wherein the second means includes a third switch, responsive to the vehicle accelerator, which enables the second switch actuating means to close the first switch in the second means and open the other one of the pair of second switches in the third means when force is applied to the accelerator and which enables the second switch actuating means to open the first switch and close the second switch when no force is applied to the accelerator.

6. A vehicle motion indicating device including:
   a power supply;
   a first relay having a normally open switch and a normally closed switch;
   a first switch means for coupling the first relay to the power source;
   a second relay having a normally open switch and a normally closed switch;
   a second switch means for coupling the second relay to the power source;
   a first light coupled to the normally open switch in the first relay so that upon closing of the first switch means the relay is energized to close the normally open switch in the first delay and thereby supply power to energize the first light and provide an indication that the vehicle is stopping;
   a second light coupled to the normally open switch in the second relay so that upon closing of the second switch means the second relay is energized to close the normally open switch in the second relay and thereby supply power to energize the second light and provide an indication that the vehicle is accelerating; and a third light coupled through the normally closed switches in the first and second relays so that upon opening of the first switch the first relay is deenergized to thereby provide power to energize the third light and provide an indication that the vehicle is decelerating and so that upon opening of the second switch the second relay is deenergized to thereby provide power to energize the third light and provide an indication that the vehicle is decelerating.

* * * * *